June 24, 1930. A. E. OZOUF 1,766,762
APPARATUS FOR DRYING, SMOKING, AND CURING MEAT PRODUCTS
Filed March 12, 1928 5 Sheets-Sheet 1

INVENTOR.
Arthur E. Ozouf
BY William A. Strauch
ATTORNEYS.

Patented June 24, 1930

1,766,762

UNITED STATES PATENT OFFICE

ARTHUR E. OZOUF, OF CHICAGO, ILLINOIS, ASSIGNOR TO THE ALLBRIGHT-NELL COMPANY, OF CHICAGO, ILLINOIS, A CORPORATION OF ILLINOIS

APPARATUS FOR DRYING, SMOKING, AND CURING MEAT PRODUCTS

Application filed March 12, 1928. Serial No. 260,945.

The present invention relates to smoking, curing, and drying processes and apparatus and more particularly relates to improved processes and apparatus for drying, smoking and curing products such as frankfurters, sausage, minced ham, bacon and the like.

It has heretofore been the practice to smoke and cure meat products in curing chambers through which large volumes of gases tend to pass in hot streams or currents through restricted areas of the curing chamber. This results in the development of zones of excessive temperatures and gas pockets of widely varying conditions within the chamber. In an effort to establish more uniform conditions it has been the practice to reduce the volume of gases so that the moisture is eliminated slowly from the curing chamber and the relative humidity within the chamber is high. This necessitates prolonged treatment in order to remove the moisture from the products being cured to the point where the gases can penetrate into the pores and can become effective to properly sterilize and condition the products and to impart thereto the desired keeping qualities, flavor and color of a high grade product. Because of the relatively slow movement of the gases through the curing chamber in prior methods, gas pockets or spots are formed which vary widely in temperature and the articles are subjected to irregular conditions.

In the prior usual smoke houses of the type in which articles are suspended on conveyors in vertical curing chambers, the articles in the hotter portions of the chamber are subjected to excessive temperatures resulting in the coagulation of the albumen, contracting of the pores and the formation of an outer crust which tends to prevent proper and rapid removal of moisture from, and penetration of the smoking and curing gases into the interior of the product, while the articles in the cooler portions of the chamber are subjected to relatively high humidity, so that the removal of moisture therefrom is slow. Because of improper distribution of gases and failure to eliminate the moisture evolved from this product with sufficient rapidity an excessive length of time is required to effect the operation. The failure to eliminate the moisture rapidly results in deterioration of the product, and bacteria tends to form which must be eliminated by the antiseptic properties of the curing gases to impart keeping qualities to the product. As a result, the shrinkage in weight of products being cured by the prior processes is ordinarily from 10 to 14 percent and the articles will vary widely in quality, color and degree of cure depending upon the particular condition in the curing chamber to which they have been subjected.

In prior smoke houses of various forms the products being cured were not subjected to an equal and uniform distribution of the gases which resulted in a non-uniform cure of the products undergoing treatment.

By proper control of the distribution, temperature and velocity of the gases and by maintaining a continuous movement of the articles to be cured in a vertical smoke house, it is possible to utilize stations in relatively close proximity on the conveyer and to crowd the articles together at each station such that the articles may touch each other and the time of treatment may be considerably reduced while uniformly cured and high grade articles of improved quality are produced. In the practice of my invention, the time of treatment of small objects such as frankfurters is reduced from one half to three hours and a product that will keep is secured with a shrinkage in weight of less than 10 percent. In this way a substantial reduction in shrinkage of meat products and increase in capacity in apparatus of this type is attained, and at the same time uniformly cured and colored products of substantially higher quality are secured.

The improved results are accomplished in one form of the invention by providing a vertical smoke-house in which the articles under treatment are caused to move continuously in a plurality of closely spaced vertical paths of movement whereby the articles agitate the atmosphere and aid in maintaining more uniform conditions in the paths of movement of the articles through the chamber, and a substantial increase in the velocity of moderately heated gases over that heretofore utilized may be secured, removing moisture to the desired degree from the pores of the product without causing contraction thereof, thus conditioning the product for rapid penetration of the curing gases. In this way the relative volume of moderately heated gases with which the products are contacted in a given period of time is substantially increased over the volume of gases with which the articles have been heretofore contacted in vertical smoke houses of prior art, and the articles are subjected to more uniform and more moderate temperature conditions than has been heretofore the practice.

Accordingly, an object of the present invention is to provide improved processes and apparatus for curing articles such as sausages, frankfurters, hams, bacon, and the like in which proper conditions for rapidly and efficiently drying and imparting a uniform cure and suitable color thereto is established.

Another object of the invention is to provide novel processes and apparatus for the smoking and curing of meats utilizing vertical conveyors in which the meat products may be carried thereby in relatively close relation to each other, while at the same time the velocity, temperatures, and distribution of the gases is such that substantial reductions in the time of treatment to effect a uniform cure are attained, and at the same time considerably improved products are secured.

A further object of the invention is the provision of improved curing, smoking and drying arrangements in which novel and efficient conveying means are provided by which the articles to be treated are carried through the treating chamber in a continuous manner.

Further objects of the invention are such as may be attained by the utilization of the various combinations, sub-combinations, and principles hereinafter more fully set forth and as defined by the scope of the subjoined claims.

For a full understanding of the invention, reference will be had to the accompanying drawings in which is disclosed apparatus for carrying my process into effect and in which—

Figure 10 is a transverse sectional view on line 10—10 of Figure 9 looking in the direction of the arrows.

Figure 14 is a broken elevational view of the opposite end of the structure illustrated in Figure 11.

Figures 1, 2, 3, 4, 5:
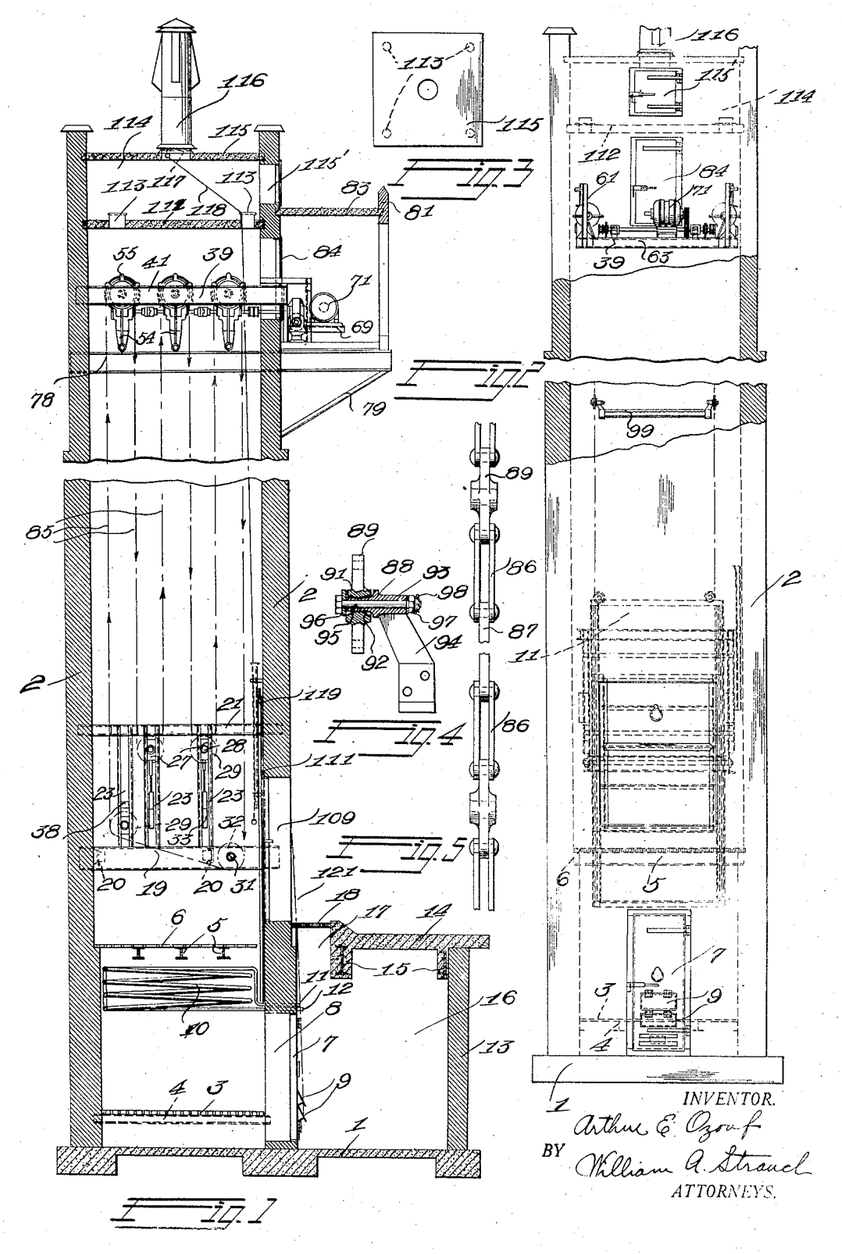
Figure 1 is a broken vertical longitudinal sectional view through a preferred form of smoke house.
Figure 2 is a broken view at right angles to that of Figure 1 partially in elevation and partially in section.
Figure 3 is a plan view of the ceiling or top for the smoke house.
Figure 4 is a side view of one of the preferred forms of hangers partly in elevation and partly in vertical section.
Figure 5 is a broken edge view of one of the preferred conveyor chains.

Referring to the drawings, and particularly Figures 1 and 2, a foundation 1 of any suitable material, such as concrete, is provided upon which the side walls 2 of the smoking or treating house, which may be of brick or other suitable material, are built. The side walls 2 extend upward from foundation 1 providing a vertical curing and smoking compartment and in which are located the conveying and treating means hereinafter specifically referred to. Adjacent the base of the walls 2 are perforated plates or grates 3 supported on suitable beams 4 which in turn have their ends secured in walls 2. Disposed above the grates 3 and supported on suitable beams 5 is a grating 6. A door 7 closes an opening 8 in one of walls 2 opposite the grates 3 for charging smoke or gas producing materials. The door 7 is provided with a plurality of hinged draft doors 9 adapted to be regulated by means hereinafter referred to. Suitably supported by walls 2 intermediate grates 3 and grating 6 is a heating steam coil 10 provided with an inlet 11 and exhaust 12.

Supported from foundation 1 is a wall 13 upon the top of which rests a loading and unloading platform 14 which is formed of concrete or other suitable material and supported and reinforced by beams 15 about which the platform is built. The wall 13 and platform 14 define a chamber 16 outward of door 7 and platform 14 terminates in spaced relation to adjacent wall 2 defining a draft opening 17, the upper end of which is closed by means of a grating 18.

Figure 15:
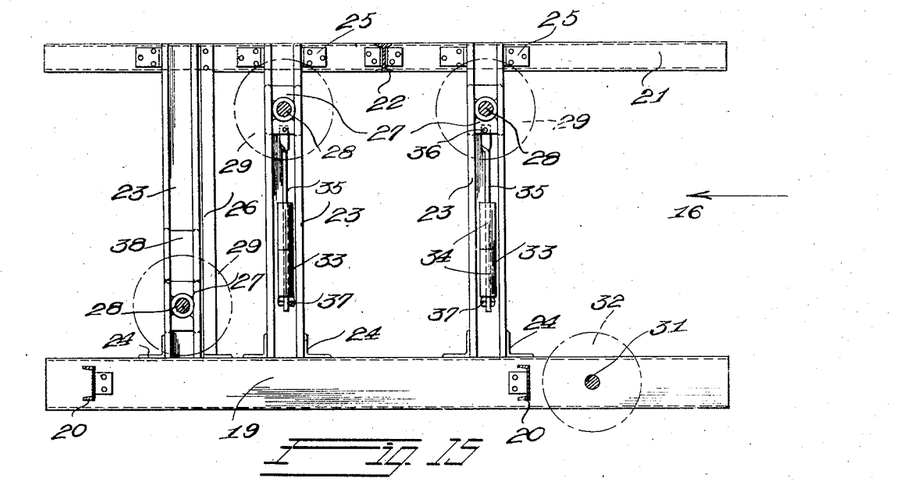
Figure 15 is a longitudinal sectional view through the conveyor tensioning mechanism utilized.
Figures 16, 17:
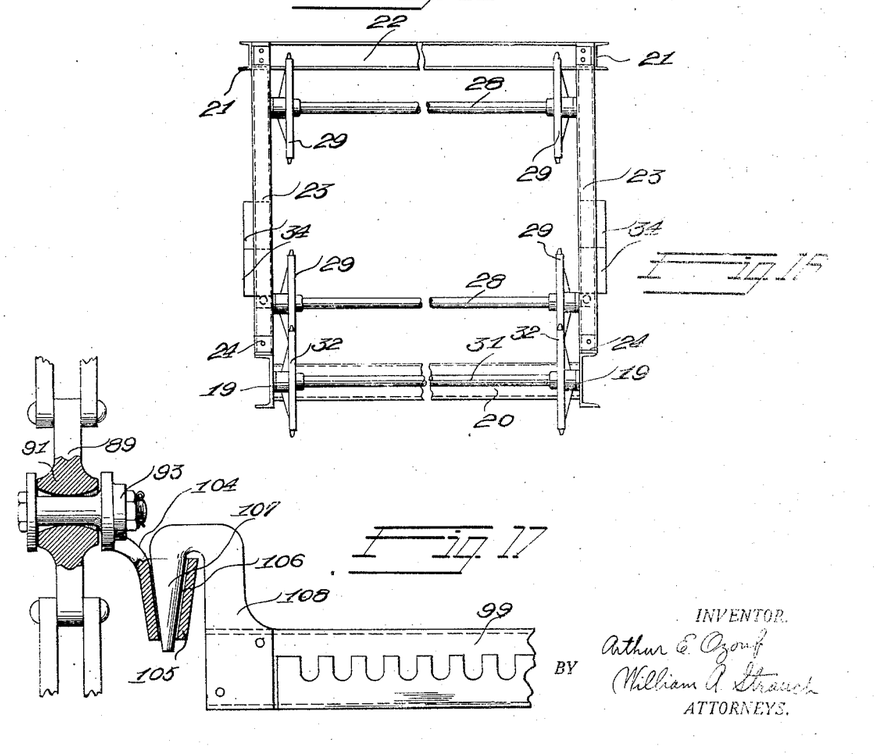
Figure 16 is a broken end elevation of the structure illustrated in Figure 15 looking in the direction of arrow 16.
Figure 17 is a side elevational view partially in section of a modified form of connection between the hanger and supporting bar.

Supported by walls 2 immediately above platform 14 is a chain supporting and take-up construction which as more clearly shown in Figures 15 and 16 comprises a pair of beams 19 having their ends secured in walls 2 as shown in Figure 1. Connected to beams 19 and extending transversely thereof are a pair of spacing and supporting beams 20. Disposed above beams 19 and parallel thereto is a pair of beams 21 which as shown in Figure 1 have their opposite ends secured in walls 2 and intermediate their ends are connected by a spacing and strengthening beam 22.

Resting upon and supported by the upper face of each beam 19 are the lower ends of three vertically disposed guide channels 23 whose lower ends are connected to beam 19 by suitable brackets 24. The upper ends of channel guides 23 are rigidly secured to beams 21 by brackets 25. It will be noted upon inspection of Figure 15 that channel guides 23 are non-uniformly spaced for a purpose hereinafter referred to and that one of channels 23 on each beam 19 is provided with a bracing angle member 26 opposite adjacent channel 23.

Slidably disposed in each of channels 23 is a bearing block 27 provided with a suitable supporting journal box or bearing for the adjacent end of sprocket shafts 28. Shafts 28 extending in parallel relation transversely of beams 19 and 21 and having their opposite ends supported in the bearings of transversely alined bearing blocks 27. Each shaft 28 has fixedly secured thereto adjacent each end thereof a sprocket 29.

Extending transversely of beams 19 and having the ends thereof journaled in suitable bearings carried thereby is a sprocket shaft 31 which has fixedly secured thereto adjacent each end thereof a sprocket 32. Two of the shafts 28 as seen in Figure 15 are in horizontal alinement and each bearing block 27 thereof is provided with a weight member 33, each of which comprises a plurality of weights 34 through which extend a rod 35 having the upper end thereof pivotally secured to bearing block 27 as at 36 and provided at the lower end thereof with weight retaining means 37. A third shaft 28, or the one supported by the braced channels 23 is disposed below horizontally disposed shafts 28 adjacent beams 19 and bearing blocks 27 therefor each support a weight 38.

In the upper part of curing and smoking compartment and supported by walls 2 is a power drive construction 39 shown in detail in Figures 11 to 14 inclusive and which comprises a pair of laterally spaced beams 41 whose ends as shown in Figure 1 are secured in opposite walls 2. Extending transversely of beams 41 in spaced relation is a pair of spacing and strengthening beams 42. Secured to each beam 41 is a plurality of equally spaced sectional housings 43, the housings carried by one beam 41 being transversely alined with the housings carried by the other beam 41. Each housing 43 comprises an outer member 44 and an inner member 45 detachably connected together by securing elements 46 one of which securing elements forms a pivot for a hinged door 47 to provide access to the housing for lubrication or other purposes. The inner and outer members 44 and 45 respectively jointly define a gear housing 48 and a worm housing 49. Each inner member 45 (Figure 14) is provided with a sprocket shaft bearing 51 and spaced therefrom is a second bearing 52 supported by the upper end of a bracket 53 whose lower end is supported by and secured to a downward extension 54 of outer member 44. Disposed between bearings 51 and 52 is a sprocket 55 carried by a shaft which is connected to and adapted for rotation by a worm gear in housing 48 driven by the worm in housing 49. The extensions 54 are provided with bosses 56 at the inner ends thereof through each transversely alined pair of which extends a rod 57 the opposite ends of which are secured thereto by nuts 58. Thus it will be seen from Figure 11 that three pairs of sprockets 55 are provided. Those of each pair being in transverse alinement and in vertical alinement with a rod 57 which connects extensions 54 of the respective housings 43 and impart rigidity to the structure.

Figures 6, 7, 8, 9, 11:
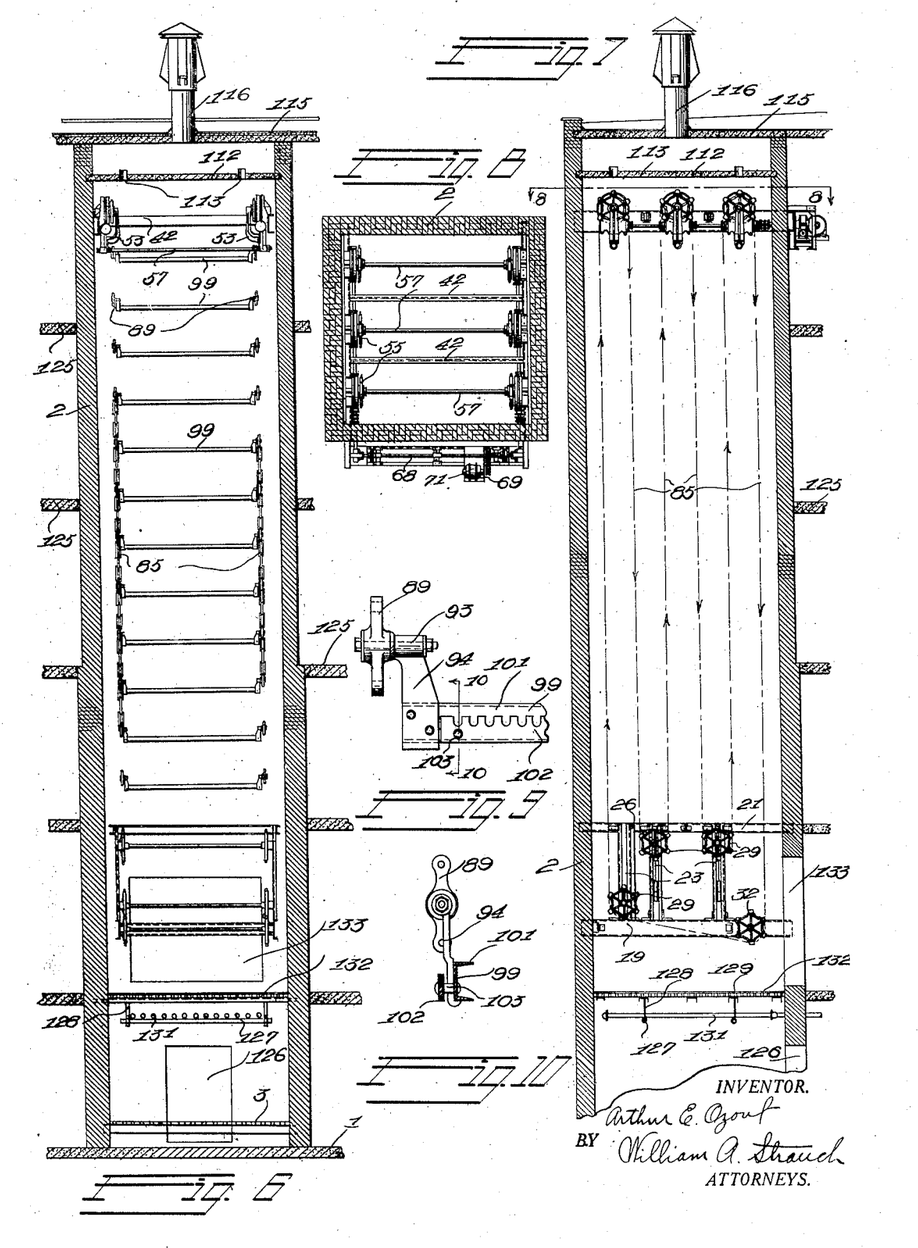
Figure 6 is a view similar to Figure 1 of a modified form of smoke house.
Figure 7 is a vertical sectional view of the form of invention shown in Figure 6 at right angles thereto.
Figure 8 is a horizontal sectional view taken on line 8—8 of Figure 7 looking in the direction of the arrows.
Figure 9 is a side elevational view of one of the hangers utilized showing the connection therewith of an adjacent end of one of the articles supporting bars.
Figure 11 is a top plan view of the conveyor driving mechanism.
Figure 11:
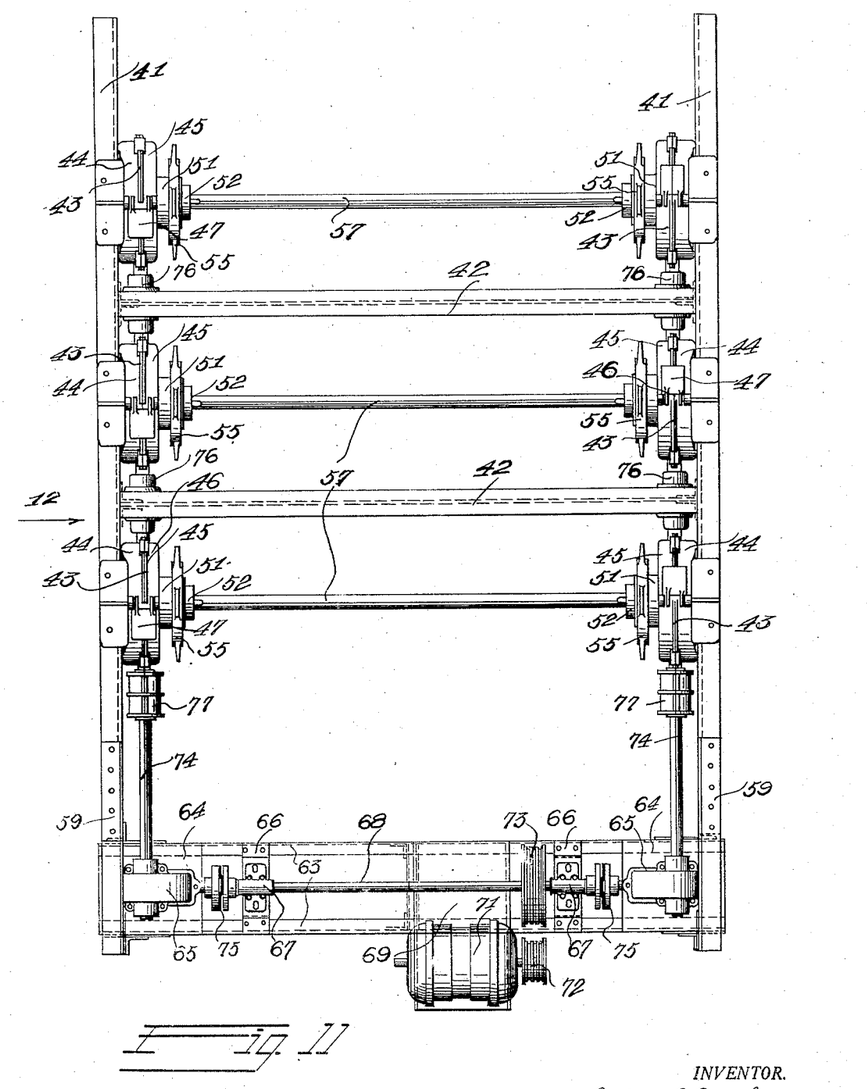
Figures 11, 12, 13:
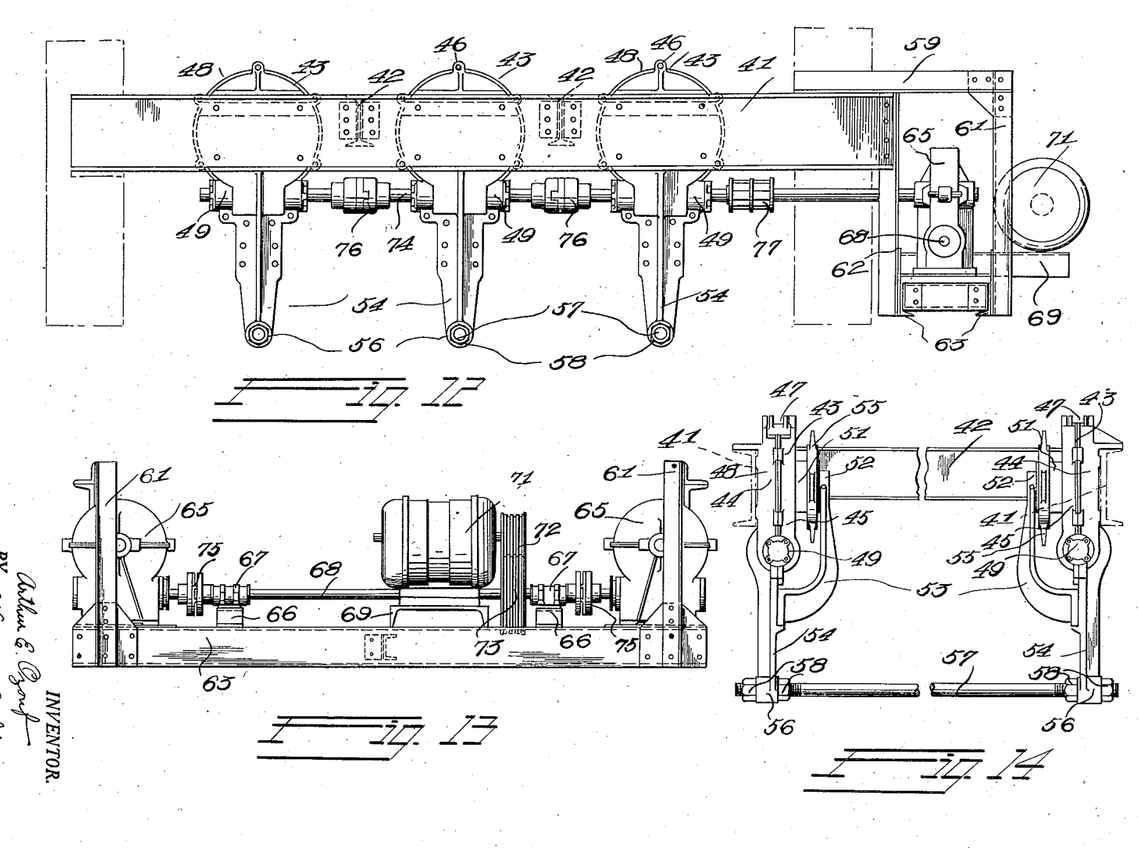
Figure 12 is a side elevational view of the structure illustrated in Figure 11 looking in the direction of arrow 12.
Figure 13 is an elevational view of the motor supporting end of the structure illustrated in Figure 11.

Secured to one end of each beam 41 on the upper face thereof and extending parallel therewith is a comparatively light short beam 59, and extending vertically of beams 59 and having the upper ends thereof secured to the outer ends of beams 59 are beams 61, and other beams 62 have the outer ends thereof secured to the ends at beams 41 and extend vertically downward therefrom parallel to beams 61. Connecting the lower ends of the respective beams 61 and 62 are a pair of transversely disposed beams 63.

Supported at either end of beams 63 on a table 64 resting on beams 63 is a combined gear and worm housing 65. Disposed transversely of and secured to the outer faces of beams 63 is a pair of spaced shaft bearing supports 66 each supporting a shaft bearing 67 in which are journaled the opposite ends of drive shaft 68.

Supported on beams 63 intermediate supports 66 is a motor base 69 on which is supported an electric motor 71. The opposite ends of drive shaft 68 extend into housings 65 and support worms which mesh with gears in the housings, the ratio between the worms and gears being about one to twelve so that the gears rotate one twelfth as fast as the worms. Motor 71 has fixedly secured to the shaft thereof a rope pull or sheave 72 which through ropes rotate a sheave 73 fixed on drive shaft 68, the ratio of pulleys 72 and 73 being about one to two. Thus it will be seen that the gears in housings 65 will be rotated at about one twenty-fourth the speed of the motor shaft. Carried by the gears in housings 65 and extending therefrom through all of the worm housings 49 is a pair of shafts 74 which carry worms adapted to mesh with gears in housings 48 which in turn through short shafts impart rotation to sprockets 55.

The drive mechanism above described would be subject to a binding action should the supporting structure embodying the walls 2 settle thus tending to throw certain of the shafts out of horizontal alinement. To prevent binding in event of such settling flexible connections are incorporated in the shafts which embody a pair of flexible couplings 75 disposed adjacent the opposite ends of drive shaft 68, a pair of flexible couplings 76 in each shaft 74 intermediate housings 43 and a compression coupling 77 in each shaft 74 intermediate housings 65 and adjacent housing 43.

Supported by walls 2 below beams 41 and in substantial alinement with the lower ends of extensions 54 is a pair of beams 78 (Figure 1) whose ends extend outwardly beyond one wall 2 to provide a support for beams 63, and suitable braces 79 connect the extreme ends of beams 78 with the adjacent wall 2. Supported by the outer ends of beams 78 is a vertical wall 81 in spaced relation to adjacent wall 2 and a suitable cover 83 connects the upper end of wall 81 with adjacent wall 2, the beams 78, wall 81 and cover 83 forming a protecting compartment within which motor 71 and the associated driving mechanism is located, the wall 2 being provided with a door 84 for providing access to sprockets 55 and associated parts from within the motor compartment.

Passing around sprockets 29 and 32 and 55 at each side of the curing and smoking chamber is an endless chain 85 which as shown in Figures 1 and 7 passes continuously around sprocket 32 lower sprocket 29 thence vertically upward around sprocket 55, downwardly, around one of upper sprockets 29, upwardly and around second sprocket 55, downwardly and around second upper sprocket 29, upward and around third sprocket 55, downwardly and around sprocket 32 completing a continuous two way circuit both vertically and laterally of the curing and smoking chamber and forming a plurality of successive loops engaged by the respective sprockets at the upper and lower ends thereof. It will be seen from Figures 1 and 7 that channels 23 are located to dispose the successive runs of the chains in vertical, parallel and uniform spaced relation. It will further be noted that while the pull on upper sprockets 29 is vertical that on lower sprocket 29 is substantially at right angles to the length of channel 23 and consequently this channel is provided with the brace 26 before referred to. Furthermore, sprockets 29 being weighted by means of weights 34 and 38 above referred to the chain 85 will be under uniform tension throughout its length at all times. Each chain 85 comprises alternate pivotally connected links 86 and 87 and interposed in the chain 85 at uniformly spaced intervals are hangers 88, each of which comprises a link 89 provided with a hub portion 91 whose bore, as is shown in Figure 4, is outwardly curved providing a rocking seat for reduced portion 92 of spindle 93 from which depends an arm 94. Spindle 93 is secured to link 89 by means of bolt 95 extending therethrough and a washer 96 positioned between the head of bolt 95 and reduced portion 92, a nut and cotter pin 97 and 98 respectively holding bolt 95 in spindle 93.

The hangers 88 are located in the opposite chains 85 in transversely alined position, and secured to each pair of transversely alined arms 94 are the opposite ends of a hanging bar 99, (Figures 9 and 10) which comprises a channel bar 101 and a regularly notched bar 102 carried by bar 101 in spaced relation thereto by means of shouldered studs 103.

In Figure 17 is disclosed a modified form of hanging bar, and support therefor in which arm 104 is provided with a conical member 105 having a conical socket 106 adapted to detachably receive the tapered end 107 of an arm 108 to which hanging bar 99 is secured. In this form of the invention hanging bar is readily detachable, facilitating washing thereof.

One of the walls 2 is provided with an opening 109 providing access to the interior of the curing and smoking chamber from platform 14 for the purpose of loading and unloading the hanging bars 99, and the opening 109 is provided with a sliding door 111 for closing same.

The ceiling or top 112 of the curing and smoking chamber is provided with a plurality of copper gas ducts 113 preferably disposed substantially at the four corners of the ceiling as shown in Figure 3 and the smoke or gases from the upper part of the curing and smoking chamber pass through ducts 113 into a chamber 114 which is formed by ceiling 112 and roof 115.

A ventilator or stack 116 through which the smoke or gases pass to atmosphere is provided in roof 115, and a damper 117 is provided in the stack. Secured to damper 117 is an operating chain 118, the opposite end of which extends through a guide tube 119 secured to wall 2 adjacent opening 109, and an operating chain 121 is secured to dampers 9 and extends into proximity to opening 109 whereby both sets of dampers can be operated from the loading and unloading platform 14.

In operation of this form of the invention, the articles to be cured or smoked are transferred from platform 14 through opening 109 and placed on the hanging bars 99 by engagement with the notches therein, the successive bars being unloaded and loaded as they slowly progress between sprockets 29 and 32, the attendant standing upon grating 6 when receiving and placing articles from and on the hanging bars. When the hanging bars are loaded with articles to be treated the doors are all closed and the continuous chains 85 are driven by motor 71 through sprockets 55 at a comparatively slow speed traveling in the direction indicated by the arrows in Figure 1 and carrying the articles undergoing treatment from the front to the back of the curing and smoking chamber and thence from the back to the front again in an up and down loop course about the sprockets 29, 32 and 55, the weights 33 and 38 maintaining the chains taut at all times assuring the proper operation thereof. Should any loop of either chain become displaced from engagement with a sprocket 55 it will be caught by the rod 57 vertically disposed thereunder and thus prevented from falling to the bottom of the curing and smoking chamber. At the beginning of the treatment steam may be circulated through coils 10 to heat the curing chamber to cause the initial moisture to be driven rapidly from the products being treated leaving the pores thereof open so that the smoke will more rapidly penetrate the products.

Smoke and gas producing material is introduced through door 7 into grate 3 and ignited by any suitable means such as a gas burner and the articles conveyed by chains 85 are subjected to the smoke and gases which pass out of the curing and smoking chamber thru ducts 113 and stack or ventilator 116, the drafts 9 and 117 being operated through the respective chains 121 and 118 to cause proper circulation of the generated gases and smoke.

As the products circulated continuously through the curing chamber and repeatedly move through every part of the chamber, all are subjected to approximately the same treating and curing conditions, the atmosphere of the chamber is agitated and the formation of pockets is prevented, the products contact with a maximum volume of gases, and a rapid uniform cure is effected in a minimum time and with minimum shrinkage.

In Figures 6, 7 and 8 is disclosed a modified form of the invention in which the walls 2 of the curing and smoking chamber extend vertically upward through a plurality of floors 125 thus eliminating the necessity of a loading and unloading platform and motor attending chamber as embodied in the form above described. In this form of the invention the combustible material is introduced through an opening 126 in one of walls 2 adjacent foundation 1 onto grate 3. Located above opening 126 and supported on rods 127 suspended by brackets 128 from bars 129 is a flat steam coil 131. Resting upon bars 129 as well as a plurality of other similar bars is a grating 132 which as shown is substantially flush with the first floor 125, a doorway 133 is provided in one of walls 2 to provide entrance to the interior of the curing and chamber for loading and unloading articles to be treated on and from bars 99.

In other respects this form of the invention is substantially the same as the first form with the exception that the flexible couplings in shafts 74 are not disclosed but which may obviously be employed in this form of the invention and furthermore doors 84 and 115 are eliminated thus forming a completely closed chamber from doorway 133 to cover 112.

The operation of this form of the invention and the method by which the articles are treated is the same as that above described in connection with the first form of the invention.

While I have disclosed the power drive construction and the chain supporting and take-up construction cooperating with a multiplicity of vertically disposed parallel lengths of conveyor chain defining a plurality of loops, they are equally well adapted to support and drive a pair of oppositely positional conveyors each comprising a single loop in which instance the conveyors pass continuously around the fixed sprockets 32, the lower weighted sprockets 29 and over all of the drive sprockets 55, the intermediate sprockets 29 being inoperative.

Furthermore the construction is applicable for supporting and conveying article supporting carriages of the form disclosed in my copending application Ser. #57,191, filed Sept. 18, 1925.

In employing the construction for conveying such carriages the number of loops or vertically disposed conveyor lengths would preferably be reduced to provide ample space for the carriages which may be accomplished, by employing a pair of single loop conveyors as above referred to or a single sprocket may be substituted for the two central sprockets 29 and the conveyor chain at each side extended continuously around sprocket 32, lower sprocket 29, one of the outer sprockets 55, around the substituted sprocket, over the opposite outer sprocket 55 and thence lock to sprocket 32, the sprockets being of such size as to maintain the vertical lengths of conveyor chain in parallel relation. The carriages may, however, be used with the plural looped conveyor disclosed in which event the carriages may be relatively smaller than those disclosed in said copending application due to the relatively close spacing of the vertical conveyor lengths.

When conveying comparatively heavy members such as the carriages suitable guide rails may be provided between the sprockets 55 to prevent undue sagging of the horizontally disposed lengths of the conveyor, and the conveyor may be similarly supported between sprocket 32 and lower sprocket 29.

From the foregoing disclosure it will be seen that processes and apparatus is provided for the efficient and expeditious treatment of articles such as sausages, frankfurters, hams, bacon and the like by which a comparatively large number of articles are capable of being subjected to treatment at one time and by which the articles under treatment are subjected to the action of the gases in such manner that a rapid, effective and uniform treatment is secured with a minimized shrinkage.

Having disclosed certain specific embodiments of my invention, only, it is to be understood the invention is not limited to the details hereinbefore disclosed but that the details may be varied widely without departing from the spirit of the invention as defined by the terms of the appended claims. Accordingly what I claim and desire to secure by Letters Patent is:

1. A smoke house comprising a vertical chamber; a plurality of sprockets supported adjacent the top of said chamber; a plurality of sprockets supported below said first plurality of sprockets; a vertical endless conveyor passing over said sprockets; and meat supporting means carried by said conveyor.

2. In combination; a treating chamber; conveying means in said treating chamber in the form of a plurality of loops; and means for equally tensioning individual ones of said loops.

3. In combination; a curing and smoking chamber; a plurality of sprockets adjacent the top of said chamber; a plurality of sprockets below said first sprockets; an endless conveyor passing over said sprockets; hangers supported by said conveyor in transversely alined pairs; and a notched article supporting bar carried by each pair of said hangers.

4. In combination; a curing chamber; a frame supported adjacent the top of said chamber; a plurality of transversely alined sprockets carried by said frame member; a second frame member below said first frame member; a plurality of transversely alined sprockets carried by said second frame member; and an endless conveyor passing successively over said sprockets in said first frame and said second frame respectively.

5. A smoke house comprising a treating chamber; a plurality of sprockets adjacent the top of said chamber; a plurality of sprockets below said first sprockets; and an endless conveyor passing over said sprockets in loop formation from one side of said chamber to the other.

6. In combination; vertical endless conveying means; a plurality of article supporting members carried by said conveying means; each of said members comprising a channel member and a notched supporting bar secured to said channel member in spaced relation thereto.

7. The structure set forth in claim 6 in which each of said supporting members is detachably connected with said conveying means.

8. In combination; a vertical chamber; a plurality of transversely alined pairs of sprockets supported adjacent the top of said chamber; a plurality of transversely alined pairs of sprockets substantially below said first plurality of sprockets; an endless conveyor passing continuously and successively over said transversely alined pairs of sprockets of said first plurality of sprockets and said second plurality of sprockets respectively; and means for individually driving said transversely alined pairs of sprockets of said first plurality of sprockets.

9. The combination as set forth in claim 8 in which said means comprises a pair of flexible shafts; and a drive connection between said shafts and each of the sprockets of said first plurality of sprockets.

10. The combination as set forth in claim 8 in which some of said second transversely alined pairs of sprockets are floatingly supported and weighted for placing a constant and uniform tension on said conveying means.

11. In combination; a vertical chamber; a plurality of sprockets supported adjacent the top of said chamber; a plurality of sprockets supported substantially below said first sprockets; an endless conveyor passing continuously over said sprockets; means for individually driving said upper sprockets; and means common to each of said lower sprockets for placing said conveyor under constant and uniform tension.

12. In combination; a vertical chamber a frame supported adjacent the top of said chamber; a second frame supported within said chamber below said first frame; a plurality of pairs of sprockets supported by each of said frames; an endless conveyor passing successively over the pairs of sprockets of said first frame and said second frame respectively; means for imparting rotation to said sprockets carried by said first frame; and means carried by said second frame for placing said conveyor under constant and uniform tension.

13. The combination set forth in claim 12; in which said first frame comprises a pair of side members; a plurality of housings detachably supported by each of said side members; a driving shaft extending through each of said plurality of housings; a flexible coupling in each driving shaft between said housings; a gear supported in each housing; a worm in each housing meshing with said gear and carried by the respective driving shaft; means for simultaneously imparting rotation to said driving shafts; each of said gears upon rotation thereof imparting rotation to one of said sprockets, carried by said first frame.

14. The combination set forth in claim 12 in which said second frame comprises a pair of upper members; a pair of lower members; a plurality of channel guide members connecting each member of said upper members with each member of said lower members; a bearing block slidingly mounted in each of said channel guide members; a shaft rotatably supported by each pair of bearing blocks; said shafts rotatably supporting said second pairs of sprockets.

15. A smoke-house comprising a vertical chamber; an endless conveyor comprising a plurality of vertical loops in said chamber; a loading and unloading opening giving access to said conveyor; a loading and unloading platform adjacent said opening; a grating in said chamber slightly below the bottom of said opening; a steam coil in said chamber directly below said grating; a combustion zone below said coil; and draft means in said loading and unloading platform and in the wall defining said chamber adjacent said combustion zone.

16. In a smoke-house; conveyor driving mechanism comprising a frame; a plurality of housings supported by each side of said frame; a driven shaft extending through said plurality of housings at each side of said frame; a gear supported in each housing; a pinion in each housing meshing with said gear and carried by one of said shafts; each of said gears connected with and adapted to impart rotation to a conveyor sprocket; flexible couplings in said shafts between said housings; a drive shaft; speed reducing connections between said first shafts and said drive shaft; flexible couplings in said drive shaft; and means for imparting rotation to said drive shaft.

17. In combination; a vertical chamber; a vertical endless conveyor in said chamber; means adjacent the top of said chamber for imparting movement to said conveyor; means below said first means for guiding and tensioning said conveyor; said last means comprising a frame; a plurality of vertical guides supported by each side of said frame; bearing blocks slidably mounted in said guides in transversely alined pairs; a shaft rotatably supported by each pair of bearing blocks; a weight supported by each bearing block; a conveyor sprocket carried by each shaft adjacent each end thereof; a shaft rotatably supported in said frame; and a pair of conveyor sprockets carried by said last shaft.

18. In a smoke house; an endless conveyor; transversely alined hangers carried by said conveyor in closely spaced relation throughout the length thereof; each of said hangers provided with a conical seat; a supporting member for each pair of transversely alined hangers; each supporting member comprising a channel bar and a notched supporting bar secured in spaced relation to said channel bar; each supporting member provided with a conical projection at each end thereof for detachable engagement in one of said conical seats.

In testimony whereof I affix my signature.

ARTHUR E. OZOUF.